United States Patent
Hanebutte et al.

(10) Patent No.: US 12,443,399 B1
(45) Date of Patent: Oct. 14, 2025

(54) METHOD AND SYSTEM FOR CODE OPTIMIZATION BASED ON STATISTICAL DATA

(71) Applicant: Marvell Asia Pte Ltd, Singapore (SG)

(72) Inventors: Ulf Hanebutte, Gig Harbor, WA (US); Senad Durakovic, Palo Alto, CA (US); Harri Hakkarainen, Los Gatos, CA (US); Chien-Chun Chou, Morgan Hill, CA (US); Veena Karthikeyan, Mountain View, CA (US); Fu-Hwa Wang, Saratoga, CA (US)

(73) Assignee: Marvell Asia Pte Ltd, Singapore (SG)

( * ) Notice: Subject to any disclaimer, the term of this patent is extended or adjusted under 35 U.S.C. 154(b) by 145 days.

(21) Appl. No.: 18/118,325

(22) Filed: Mar. 7, 2023

Related U.S. Application Data

(60) Provisional application No. 63/317,110, filed on Mar. 7, 2022.

(51) Int. Cl.
*G06F 8/41* (2018.01)
*G06F 11/34* (2006.01)

(52) U.S. Cl.
CPC .............. *G06F 8/443* (2013.01); *G06F 8/48* (2013.01); *G06F 11/3452* (2013.01); *G06F 11/3457* (2013.01)

(58) Field of Classification Search
CPC ........ G06F 8/443; G06F 8/48; G06F 11/3452; G06F 11/3457; G06N 20/00
See application file for complete search history.

(56) References Cited

U.S. PATENT DOCUMENTS

| | | | |
|---|---|---|---|
| 2008/0028371 A1* | 1/2008 | Brothers | G06F 11/0775 717/136 |
| 2010/0037035 A1* | 2/2010 | Archer | G06F 8/443 712/E9.016 |
| 2016/0328169 A1* | 11/2016 | Hassan | G06F 8/51 |
| 2021/0096892 A1* | 4/2021 | Nigro | G06F 9/45525 |
| 2022/0342647 A1* | 10/2022 | Drepper | G06F 8/443 |

FOREIGN PATENT DOCUMENTS

| | | | | |
|---|---|---|---|---|
| EP | 4231204 A1 | * | 8/2023 | ............. G06N 10/80 |
| GB | 2589900 A | * | 6/2021 | ............. G06F 11/302 |

* cited by examiner

*Primary Examiner* — Ziaul A Chowdhury

(57) ABSTRACT

A method includes receiving a high-level function in a first high-level code; compiling the high-level function into a first set of low-level instructions to be executed on a hardware or a simulator; transmitting the first set of low-level instructions to the hardware or the simulator; receiving a plurality of statistical data generated by the hardware or the simulator in response to execution of the first set of low-level instructions, wherein the plurality of statistical data is performance related; determining whether to make changes to the compilation associated with the high-level function in the first high-level code based on the plurality of statistical data; recompiling the high-level function into a second set of low-level instructions to be executed on the hardware or the simulator based on the changes to the compilation; and transmitting the second set of low-level instructions to the hardware or the simulator.

34 Claims, 11 Drawing Sheets

Input Placeholder 1 :

permute_input_0 : float, [8, 1, 32, 32]

Layer 1 : Conv input[1]: uint8, [batch, inC, H, W] = [8, 1, 32, 32]
    Weight: int8, [outC, inC, H, W] = [64, 1, 3, 3]
    Bias: int32, [64]
    Padding: [top, left, bottom, right] = 0, 0, 0, 0
    Stride: [h, w] = [1, 1]
    Dilation: [h, w] = [1, 1]
    Activation: relu
    output: uint8, [batch, H, W, outC] = [8, 30, 30, 64]
    # of MACs: 4147200
    # of Parameters: 640
    => To Layers: 2, Layer 2 : Maxpool Kernel: [H, W] = [2, 2]
    Padding: [top, left, bottom, right] = 0, 0, 0, 0
    Stride: [h, w] = [2, 2]
    output: int8, [batch, H, W, outC] = [8, 15, 15, 64]
    Max-Counts: 460800
    => To Layers: 3, Layer 3 : Conv Weight: int8, [outC, H, W, inC] = [32, 2, 2, 64]
    Bias: int32, [32]
    Padding: [top, left, bottom, right] = 0, 0, 0, 0
    Stride: [h, w] = [1, 1]
    Dilation: [h, w] = [1, 1]
    Activation: relu
    output: uint8, [batch, H, W, outC] = [8, 14, 14, 32]
    # of MACs: 1284508
    # of Parameters: 8224
    => To Layers: 4,

FIGURE 4A

Layer 4 : Maxpool

Kernel: [H, W] = [2, 2]

Padding: [top, left, bottom, right] = 0, 0, 0, 0

Stride: [h, w] = [2, 2]

output: int8, [batch, H, W, outC] = [8, 7, 7, 32]

Max-Counts: 50176

=> To Layers: 5,

Layer 5 : FC

Weight: int8, [inC, outC] = [1568, 64]

Bias: int32, [64]

Activation: relu output: uint8, [batch, outC] = [8, 64]

of MACs: 802816 of Parameters: 100416

=> To Layers: 6,

Layer 6 : FC

Weight: int8, [inC, outC] = [64, 32]

Bias: int32, [32]

Activation: relu output: uint8, [batch, outC] = [8, 32]

of MACs: 16384 of Parameters: 2080

=> To Output Placeholder: dense_1_Relu_0

Output Placeholder 1 :

ONNX dense_1_Relu_0 : uint8, [8, 32]

FIGURE 4B

-WARNING-Performance:: ISA (Task 1, inst 3): Transfer byte size used = 14 - actual transfer efficiency: 5.46875 %
-WARNING-Performance:: ISA (Task 14, inst 3): Transfer byte size used = 24 - actual transfer efficiency: 9.375 %
-WARNING-Performance:: ISA (Task 32, inst 3): Transfer byte size used = 24 - actual transfer efficiency: 9.375 %
-WARNING-Performance:: ISA (Task 44, inst 2): Transfer byte size used = 8 - actual transfer efficiency: 3.125 %
-WARNING-Performance:: ISA (Task 45, inst 3): Transfer byte size used = 14 - actual transfer efficiency: 5.46875 %
-WARNING-Performance:: ISA (Task 47, inst 3): Transfer byte size used = 14 - actual transfer efficiency: 5.46875 %
-WARNING-Performance:: ISA (Task 54, inst 2): Transfer byte size used = 8 - actual transfer efficiency: 3.125 %
-WARNING-Performance:: ISA (Task 56, inst 2): Transfer byte size used = 8 - actual transfer efficiency: 3.125 %
-WARNING-Performance:: ISA (Task 58, inst 2): Transfer byte size used = 4 - actual transfer efficiency: 1.5625 %
-WARNING-Performance:: ISA (Task 59, inst 3): Transfer byte size used = 14 - actual transfer efficiency: 5.46875 %
-WARNING-Performance:: ISA (Task 61, inst 3): Transfer byte size used = 14 - actual transfer efficiency: 5.46875 %
-WARNING-Performance:: ISA (Task 68, inst 2): Transfer byte size used = 8 - actual transfer efficiency: 3.125 %
-WARNING-Performance:: ISA (Task 70, inst 2): Transfer byte size used = 8 - actual transfer efficiency: 3.125 %
-WARNING-Performance:: ISA (Task 72, inst 2): Transfer byte size used = 4 - actual transfer efficiency: 1.5625 %
-WARNING-Performance:: ISA (Task 73, inst 3): Transfer byte size used = 14 - actual transfer efficiency: 5.46875 %
-WARNING-Performance:: ISA (Task 75, inst 3): Transfer byte size used = 14 - actual transfer efficiency: 5.46875 %
-WARNING-Performance:: ISA (Task 98, inst 3): Transfer byte size used = 24 - actual transfer efficiency: 9.375 %
-WARNING-Performance:: ISA (Task 100, inst 3): Transfer byte size used = 24 - actual transfer efficiency: 9.375 %
-WARNING-Performance:: ISA (Task 106, inst 3): Transfer byte size used = 24 - actual transfer efficiency: 9.375 %
-WARNING-Performance:: ISA (Task 108, inst 3): Transfer byte size used = 24 - actual transfer efficiency: 9.375 %
-WARNING-Performance:: ISA (Task 130, inst 2): Transfer byte size used = 8 - actual transfer efficiency: 3.125 %
-WARNING-Performance:: ISA (Task 132, inst 2): Transfer byte size used = 8 - actual transfer efficiency: 3.125 %

FIGURE 5

```
{
"file_type": "PerfProfilingInfo",
"bin": "main",

"layers": [
{"id": 1, "op": "CONV", "to_layer_ids": [2],
"first_onnx_op": "Conv_14_transpose_3", "last_onnx_op": "conv2d_Relu_1",
"first_inst_id":0, "last_inst_id": 242,
}
,{"id": 2, "op": "MAXPOOL", "to_layer_ids": [3],
"first_onnx_op": "max_pooling2d_MaxPool_1", "last_onnx_op":
"max_pooling2d_MaxPool_1",
"first_inst_id":243, "last_inst_id": 251,
}
, {"id": 3, "op": "CONV", "to_layer_ids": [4],
"first_onnx_op": "Conv_15_transpose_3", "last_onnx_op": "conv2d_Relu_1",
"first_inst_id":252, "last_inst_id": 262,
}
,{"id": 4, "op": "MAXPOOL", "to_layer_ids": [5],
"first_onnx_op": "max_pooling2d_1_MaxPool_1", "last_onnx_op": "flatten_Reshape",
"first_inst_id":263, "last_inst_id": 271,
}
,{"id": 5, "op": "FC", "to_layer_ids": [6],
"first_onnx_op": "dense_MatMul", "last_onnx_op": "dense_Relu",
"first_inst_id":272, "last_inst_id": 339,
}
,{"id": 6, "op": "FC", "to_layer_ids": [ ],
"first_onnx_op": "dense_1_MatMul", "last_onnx_op": "dense_1_Relu_0",
"first_inst_id":340, "last_inst_id": 349,
}
],
}
```

FIGURE 6

| Layer | Tiles | Cycles | MAC count |
|---|---|---|---|
| Init | | 6500 | |
| CONV_1 | 8 | 8905 | 4147200 |
| MAXPOOL_2 | 8 | 5440 | |
| CONV_3 | 8 | 2068 | 12845056 |
| MAXPOOL_4 | 8 | 628 | |
| FC_5 | 8 | 1007 | 802816 |
| FC_6 | 1 | 95 | 16384 |
| Finish | 1 | 92 | |

FIGURE 7A

| layer | tiles | cycles | time(us) | matmul_ops | TOPS | TFLOPS | INT_ER(%) | FP_eff(%) | max_scm_bytes | max_ccm_usage(%) | POD_Cycles | PE_Cycles | DMA_Cycles |
|---|---|---|---|---|---|---|---|---|---|---|---|---|---|
| init | 1 | 6500 | 6.500 | 0 | 0 | 0 | 0 | 0 | 23973 | 2.336 | 0 | 0 | 6444 |
| CONV_1 | 8 | 8905 | 8.905 | 4147200 | 0.931 | 0 | 3.685 | 0 | 60591 | 5.778 | 8040 | 3093 | 563 |
| MAXPOOL_2 | 8 | 5440 | 5.440 | 0 | 0 | 0 | 0 | 0 | 72060 | 6.868 | 0 | 5417 | 0 |
| CONV_3 | 8 | 2068 | 2.068 | 12845056 | 12.132 | 0 | 75.822 | 0 | 28992 | 2.769 | 2832 | 0 | 0 |
| MAXPOOL_4 | 8 | 628 | 0.628 | 0 | 0 | 0 | 0 | 0 | 7840 | 0.748 | 0 | 805 | 0 |
| FC_5 | 8 | 1007 | 1.007 | 802816 | 1.557 | 0 | 9.732 | 0 | 27264 | 2.6 | 130 | 782 | 0 |
| FC_6 | 1 | 95 | 0.095 | 16384 | 0.337 | 0 | 16.842 | 0 | 2944 | 0.281 | 70 | 0 | 0 |
| finish | 1 | 92 | 0.092 | 0 | 0 | 0 | 0 | 0 | 320 | 0.031 | 0 | 0 | 38 |

FIGURE 7B

METHOD AND SYSTEM FOR CODE OPTIMIZATION BASED ON STATISTICAL DATA

RELATED APPLICATION

This application is a nonprovisional application and claims the benefit and priority to a provisional application No. 63/317,110 filed on Mar. 7, 2022, which is incorporated herein by reference in its entirety.

BACKGROUND

Use and implementations of machine learning (ML) and artificial intelligence (AI) methods on electronic devices has become ubiquitous. The design of a hardware architecture of the electronic devices, whether a processor, a programmable logic, a dedicated hardware such as application specific integrated circuit (ASIC), or a dedicated ML hardware, often goes through various optimization and compilation processes.

A compilation process or a compiler generates low-level executable instructions (in binary) from one or more high-level code (e.g., associated with an ML model) and identifies hardware resources (e.g., accelerator and/or general-purpose processor) to execute the low-level executable instructions. The compilation is generally an ahead of time (AOT) compilation and may include quantization, reduction in mathematical precision, mapping of the application (e.g., a neural network) to a specific number of processing tiles of the hardware, etc. The compiler may optimize the code to reduce latency and/or increase throughput. In general, the compiler maps data, e.g., the network tensor weight, the network tensor bias constants, the network tensor input and output for each network layer, etc., to particular memories and generates the executable code associated therewith. For example, the compiler decides on which processing tile and which processing unit (e.g., POD and/or PE) of the tile of a multi-core system will be processing certain data. As another example, the compiler may decide that certain data is to be processed by a central processing unit as opposed to a processing tile within a ML hardware.

In some conventional solutions, profile guide optimization may be used for general purpose compilers to generate code for general central processing units (CPUs). Unfortunately, profile guide solutions often do not apply to large and complex ML models that run on inference accelerators. Moreover, the compilation process and code optimization become more complex and challenging for accelerators with array-based inference engine with many processing tiles, many on-chip memories, many dense computing elements (e.g., POD), and many sparse/irregular computing element (e.g., PE) because the compilation and code optimization often involved generating a parallel executable with optimal data layout, reduced data movement, and reduced memory usage, etc. In some conventional solutions a manual process of iterative compilation with various compile flags and/or configurations may be performed and run on hardware in order to identify compile flags/configurations that result in best performance is often the only solution, which is tedious and time consuming.

It is appreciated that the challenges associated with compiler optimizing code for array-based inference engine is further compounded by large and complex ML models that rapidly evolve. ML models are generally represented by graphs containing a plurality of nodes (i.e., layer) that are operated on large multi-dimensional tensors. Some compilers may support specific compile arguments to trigger specific compiler optimization that were previously developed, e.g., developed by the compiler developer and made available to the user. Unfortunately, optimization to codes, if any, are provided as options by the compiler developer.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 4A-4B depict an example of statistical data generated by a roofline model according to one aspect of the present embodiments.

FIG. 5 depicts an example of statistical analysis generated by the model binary analyzer according to one aspect of the present embodiments.

FIG. 6 depicts an example of high-level instructions generated by a compiler that is used generate low-level instructions for execution by a hardware or a simulator according to one aspect of the present embodiments.

FIGS. 7A and 7B depict examples of statical data generated by a hardware or a simulator executing the low-level instructions according to one aspect of the present embodiments.

DETAILED DESCRIPTION

Figure 1:
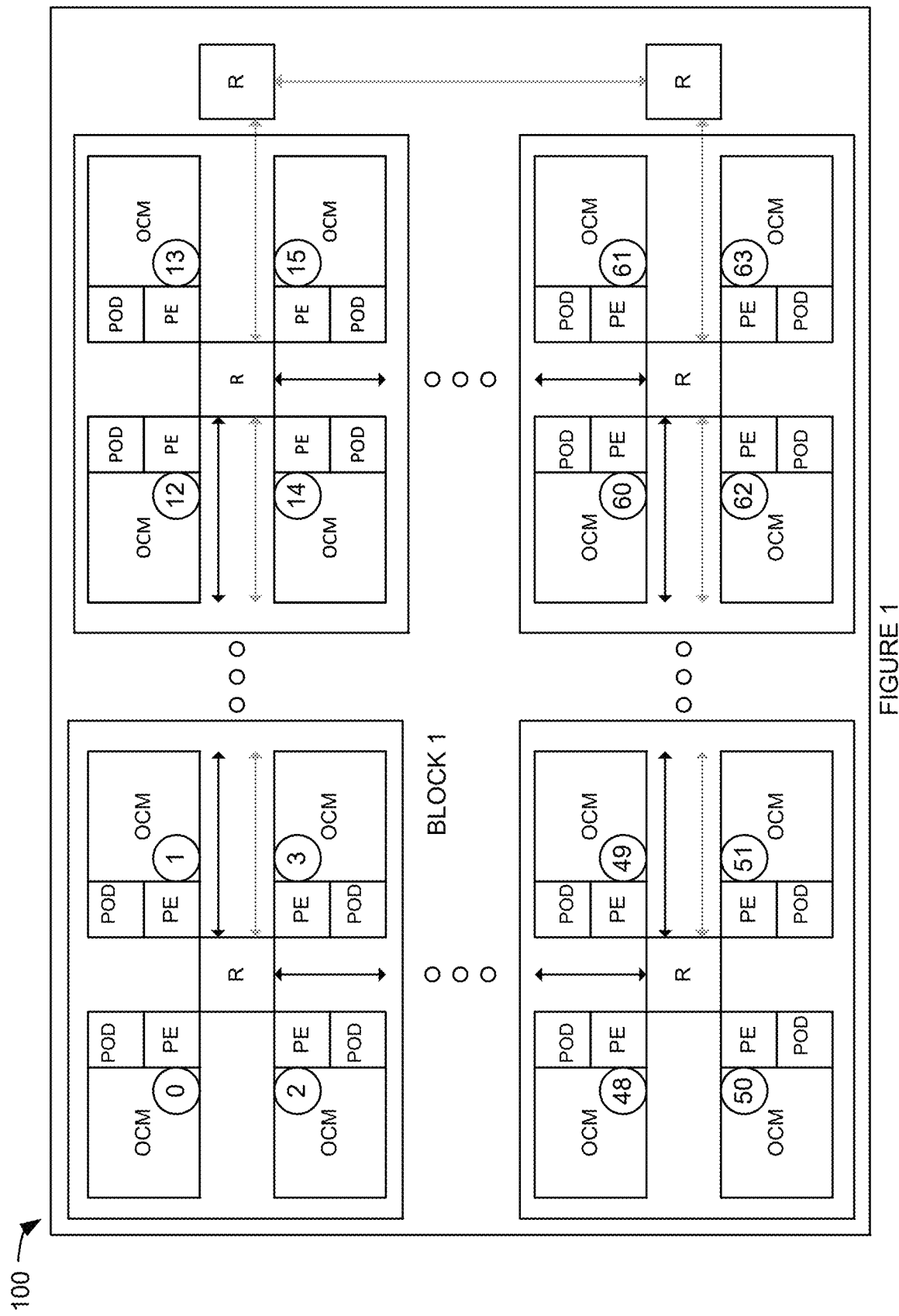
FIG. 1 depicts an example of a diagram of an ML hardware according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A need has arisen to utilize statical data generated by a compiler and/or processor and/or a hardware/simulator to determine optimization that may be made to the strategy or to the code in order to improve performance. It is appreciated that in some embodiments, the statistical data is generated, the code is optimized, and the code is subsequently compiled, in an iterative fashion. It is appreciated that the compilation may be an AOT compilation.

It is appreciated that the embodiments are described with respect to ML models and compilation with respect to ML models for illustrative purposes only. It is appreciated that statistical data may be used by the compiler to generate highly optimized code for complex ML models and to enable the best suited high-level primitives to be selected in order to increase parallelization strategy, reduce latency, increase throughput, etc., for a given target platform (e.g., array-based inference engine). The embodiments should not be construed as limited to ML models but to the contrary it is meant to encompass any high-level code, its compilation, and its optimization.

In general, a compiler is configured to go through the ML model and generate multiple levels or stages during compilation of high-level code into low-level executable instructions on a hardware. It is appreciated that the multiple levels generated may be referred to as the compilation flow associated with a particular ML model. At each level (i.e., stage), the compiler needs to make one or more decisions on compilation, e.g., how to map the data to be processed and to which memory blocks, decision on a particular processing tile to execute the executable code for a particular data, etc. It is appreciated that there may be more than one approach (i.e., strategy) to execute a particular task, e.g., convolution. The compiler then generates a low-level executable code based on the actions/decisions that were made, which can be executed by hardware, e.g., an accelerator.

It is appreciated that statistical data may be generated by the compiler according to some embodiments. For example, during compile state, the compiler may determine the compilation flow and/or high-level instructions associated therewith. The compiler may subsequently call the library, e.g., ML library application specific interface (API), with the determined arguments that described the specific computation (e.g., function) and/or communication task to be performed by that ML API, for each layer (or node) of the compilation flow. The library may then respond to the compiler's ML library API call. The response by the ML library API may be used by the compiler and fed into a model, e.g., roofline model, to generate a target specific runtime performance estimation on a per ML library API basis. It is appreciated that the model such as the roofline model may be provided by the ML library or compiler. As such, the runtime performance estimation generated by the compiler and the model may be used to guide the compiler to generated an alternative compilation flow and/or high-level instructions, change strategies to solve a particular function associated with one or more layers, change the memory layout, replace the original ML library API call with a different but equivalent ML library API call, etc., in order to improve performance. For example, based on the statistical data generated by the compiler and the model, e.g., roofline model, the compiler may determine that the height/width dimensions on the tensors and/or constants of a network may be flipped in order to achieve a better parallelization and/or data alignment. In other words, statistical data associated with the per instruction (e.g., high-level compilation flow) performance within each layer may be monitored, e.g., effective bytes memory transfer associated with the instruction within a particular layer of the compilation flow, processing element(s) utilization associated with the instruction within a particular layer of the compilation flow, boundary violations associated with the instruction within a particular layer of the compilation flow (e.g., memory wrap around (i.e., when an address is calculated that is larger than the largest possible address that a certain bit width can represent then the address is truncated and mapped to the wrong address) or data hazard (e.g., incorrect synchronization between different processing elements such as PE and POD and direct memory access (DMA) within a given processing tile or across multiple processing tiles) for the high-level compilation flow), etc., to guide the compiler in deciding whether to generate an alternative compilation flow, whether to change one or more strategies, whether to change the memory layout, whether to replace the original ML library API call with an equivalent ML library API, mapping of data to memory blocks, changing precision, changing quantization, changing processing tile to perform a particular task/instruction, changing dimension reordering, copying data across processing tiles, changing methodology to split tensors, etc. Once a decision is made the compiler may iteratively go through a similar process. Ultimately, the compiler generates low-level instructions (binary) for the hardware/simulator for execution thereof.

It is appreciated that in some embodiments, statistical data may be generated by the compiler after low-level instructions (binary) is generated and analyzed by model-binary analyzer within the compiler. It is appreciated that the binary analyzer is discussed as being integrated within the compiler for illustrative purposes but should not be construed as limited thereto. For example, the binary analyzer may be separate from the compiler. Moreover, it is appreciated that the binary analyzer may be coupled to the ML library. In one nonlimiting example, after the compiler selects the final strategy, then low-level instructions (binary) may be generated. The generated low-level instructions (binary) may be used by the model-binary analyzer in order to perform an overall analysis of the compilation flow. It is appreciated that the compiler has a knowledge of the hardware architecture that will be executing the low-level instructions (binary), has a knowledge of the operations and tensors, has a knowledge of tensor transformations that have been performed throughout the compilation flow, has a knowledge of the final generated instruction (e.g., an instruction set architecture (ISA)), etc. As such, the compiler is configured to intelligently identify one or more problems associated with the generated low-level instructions (binary), e.g., problems associated with ill-formed on-chip memory (OCM) layout, insufficient data movement, memory access overlap between tasks/instructions, data hazard between consumer produced tasks (e.g., synchronization issues between processing elements within the same processing tile or between different processing tiles occurring when a consumer task may have started earlier than the data provided by the producer task is available and where data from a random data in the memory is produced instead), etc. It is appreciated that identifying certain issues such as data hazard issue may be important to prevent it from occurring. In other words the compiler may create parallel tasks in order to achieve high utilization of the resources for fast execution and identifying certain data hazard issue, as an example, is important such that appropriate synchronization point can be added by the compiler. Accordingly, the compiler may be guided to intelligently decide on alternative compilation flow, changing strategies, changing memory layout, replacing the original ML library API call with an equivalent ML library API call, modifying the mapping of data to memory blocks, modifying precision, modifying quantization, modifying the processing tile to perform a particular task/instruction, reordering dimensions, changing the strategy to copy data across processing tiles, changing the methodology to split tensors, etc., in order to improve performance. Once a decision is made the compiler may iteratively go through a similar process. Ultimately, the compiler generates low-level instructions (binary) for the hardware/simulator for execution thereof.

It is appreciated that in some embodiments, statistical data may be generated by either the hardware or the simulator executing the low-level instructions (binary) that were generated by the compiler. In other words, statistical data may be generated by the component, e.g., hardware, simulator, etc., running the low-level instructions (binary). It is appreciated that in one nonlimiting example, the compiler in addition to the low-level instructions (binary) may generate one or more meta data that is also provided to the component executing the low-level instructions (binary). The generated meta data may provide additional information regarding the ML model such as the layers and their respective mapping to specific code, e.g., high-level instructions, sections. It is appreciated that integration between the compiler and the runtime (execution by hardware/simulator) enables the process to be automated and driven by the compiler. It is further appreciated that additional statistical data, e.g., cycle counts, may be collected from the hardware/simulator running the low-level instructions. For example, statistical data generated by hardware/simulator may include space/time data (e.g., diagram) that illustrates the activities associated with each component (e.g., hardware component such as processing elements, OCM, etc.) during runtime. Accordingly, the compiler or the user may use the statistical data to determine whether parallel tasks are overlapped appropriated and whether synchronization results in unnecessary latencies, etc. The compiler may then take appropriate actions based on the statistical data in order to optimize the code by generating an alternative compilation flow, changing strategies, changing memory layout, replacing the original ML library API call with an equivalent ML library API call, modifying the mapping of data to memory blocks, modifying precision, modifying quantization, modifying the processing tile to perform a particular task/instruction, reordering dimensions, changing the strategy to copy data across processing tiles, changing the methodology to split tensors, etc. Once the code is optimized by the compiler, the compiler may regenerate an updated low-level instructions (binary) for execution by hardware/simulator. It is appreciated that this process may occur iteratively, as needed, to further optimize the code. It is appreciated that the final low-level instructions (binary) may be generated by the compiler based on the final optimized code for execution by hardware/simulator.

As such, the statistical data generated may be used by the compiler to improve performance and achieve certain efficiencies. For example, the statistical data may be used to optimize code in order to reduce data movement, reduce storage, reduce duplicate computations, reduce communication by duplicating computing if beneficial, reduce data conversions, etc.

Although an instruction set architecture (ISA) is used as a non-limiting example of the low-level instruction format to illustrate the proposed approach in the embodiments described below, it is appreciated that the same or similar approach is equally applicable to other types of low-level instructions. It is also appreciated that an ML hardware (e.g., inference engine) is used as a non-limiting example of the hardware where the low-level instructions are executed to illustrate the proposed approach in the embodiments described below, it is appreciated that the same or similar approach is equally applicable to other types of hardware or hardware simulator to support generating one or more external strategies using a compiler. Moreover, it is appreciated that an ML-related operation or function is used as a non-limiting example of the application of the high-level code to illustrate the proposed approach in the embodiments described below, it is appreciated that the same or similar approach is equally applicable to other types of software applications, including but not limited to firmware, hardware simulation software, or register transfer level (RTL) simulation software, to support the statistical data generation and/or meta data generation by the compiler.

For a non-limiting example, the hardware may be an accelerator that is array-based inference engine (i.e., ML hardware) and may include 64 processing tiles (each processing tile may further include a plurality of smaller processing elements that are described in the U.S. patent application Ser. No. 16/226,508, filed Dec. 19, 2018, now issued as the U.S. Pat. No. 11,086,633 that is incorporated herein by reference in its entirety). Each of those processing tiles is configured to receive a tensor data and an instruction (i.e., compiled SoftMax instructions, ArgMax instruction, convolution, TopK, GEMM, SUM, MUL, etc.). As such, multiple tensors may be operated on simultaneously, thereby reducing the processing time. For illustrative purposes, it is assumed that there are 64 processing tiles where each processing element is configured to process 64 elements. However, it is appreciated that any number of processing tiles may be used.

The proposed ML hardware architecture (as described in the U.S. Pat. No. 11,086,633 and as further described in FIG. 1 below) is highly efficient, flexible and optimized for high-efficiency ML computing while it reduces overhead and latencies. By providing hardware support to streamline data/instruction flow, the proposed ML hardware architecture improves system-level performance by significantly reducing the hardware overhead involved in moving data and/or instruction in existing computing architectures. The proposed ML hardware architecture works well with existing software frameworks and code and may be applied to a wide variety of ML algorithms and neural networks including, but not limited to, convolution neural network (CNN), recurrent neural network (RNN), gradient boosting machine (GBM), generative adversarial neural network, decision trees, random forest, support vector machine (SVM), clustering, Markov random field (MRF), etc.

In the example of FIG. 1, the ML-specific hardware 100 is a dedicated hardware, including one or more processors and/or OCM units storing the data and/or the set of low-level instructions compiled from the high-level code by the compiler to perform one or more ML operations, e.g., convolution, SoftMax operation, ArgMax operation, TopK operation, scatter-gather operation, etc. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks. It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

At runtime, the ML-specific hardware 100 is configured to retrieve the set of low-level instructions and/or data from the compiler and execute the set of low-level instructions to perform the one or more ML operations according to the set of low-level instructions. For a non-limiting example, the ML-specific hardware 100 can be, but is not limited to, an inference engine, which is configured to infer and identify a subject via an inference operation from data input according to the ML network model. FIG. 1 depicts a non-limiting example of an inference engine that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one OCM, a first type of processing unit (e.g., POD) for performing a first type of ML (e.g., dense) operations, and a second type of processing unit (e.g., PE) for performing a second type of ML (e.g., sparse) operations. Both types of processing units can execute and be programmed by some of the plurality of low-level instructions received from the compiler. In some embodiments, a plurality of processing tiles forms a processing block, e.g., tiles 0-3 forms processing block 1, and the processing tiles within each processing block are coupled to one another via a routing element, e.g., tiles 0-3 are coupled to one another via routing element R to form processing block 1. It is appreciated that the ML-specific hardware 100 is provided for illustrative purposes and should not be construed as limiting the scope of the embodiments.

Figure 2A:
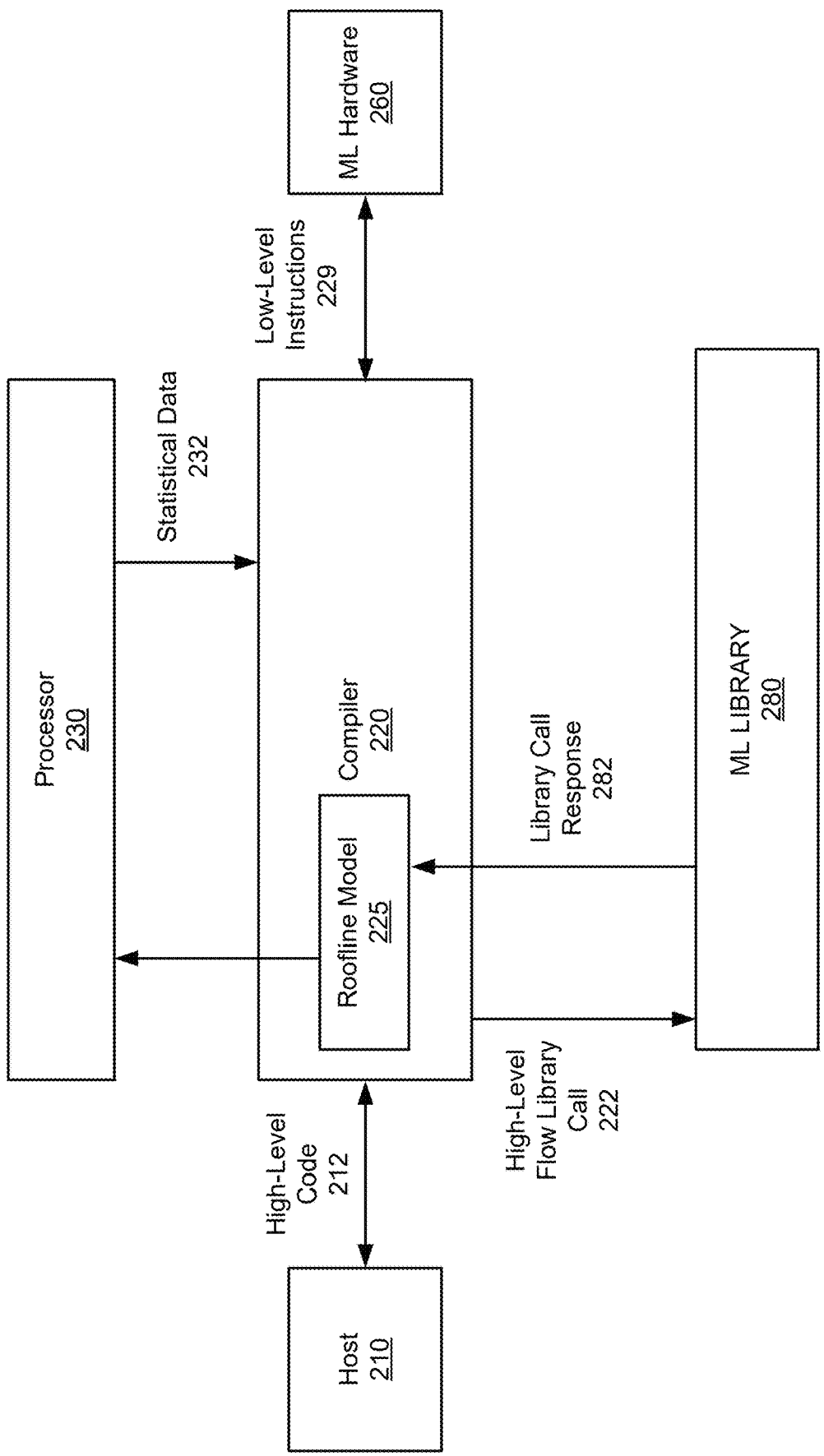
FIG. 2A depicts an example of a diagram of a system that uses statistical data during compile state of an application for running on ML hardware to determine changes that can be made by a compiler to improve performance associated with executing an application on ML hardware according to one aspect of the present embodiments.

FIG. 2A depicts an example of a diagram of a system that uses statistical data during compile state of an application for running on ML hardware to determine changes that can be made by a compiler to improve performance associated with executing an application on ML hardware according to one aspect of the present embodiments. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 2A, the system includes a host 210, a compiler (compiling engine) 220, a library 280, e.g., an ML library, a processor 230, and an ML hardware 260 (similar to ML hardware 100 described in FIG. 1). It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

It is appreciated that the compiler 220 is shown as a separate component as that of the processor 230 but it is appreciated that the compiler 220 may be a software code executing on the processor 230 and illustration of the components as separate units is for illustrative purposes only. Moreover, it is appreciated that in some embodiments the processor 230 may be integrated with the host 210 and as such illustration of the processor 230 as a separate unit as that of the host 210 is for illustration purposes only. It is appreciated that the embodiment is described with respect to the ML hardware 260 for illustration purposes only but the embodiments should not be construed as limited thereto. For example, a simulator may be used instead.

In the example of FIG. 2A, the compiler 220 coupled to a host 210 is configured to accept a high-level code 212 of an application (e.g., an ML operation, ML model, etc.) from the host 210, wherein the high-level code 212 includes a plurality of high-level functions/operators each called at one or more lines in the high-level code 212. The compiler 220 is then configured to compile each high-level function/operator in the high-level code 212 into a set of low-level instructions to be executed on the ML hardware 260, wherein each set of the low-level instructions is uniquely identified and associated with the high-level function. It is appreciated that the ML hardware 260 is provided for illustrative purposes and should not be construed as limiting the scope of the embodiments. For example, any type of hardware-based system configured to execute low-level instructions may be used.

Here, the high-level code 212 is a software code written through a commonly used high-level programming language. For a non-limiting example, the high-level functions of the application or ML operation can be a dense and/or regular operation, e.g., a matrix operation such as multiplication, matrix manipulation, tanh, sigmoid, etc. For another non-limiting example, the high-level functions of the application or ML operation can be a sparse or irregular operation, e.g., memory transpose, addition operation, operations on irregular data structures (such as trees, graphs, and priority queues), etc. In some embodiments, the high-level code of the application may include one or more library function calls to an ML library 280. For a non-limiting example, the compiler 220 may call a library function to generate the appropriate ISA instruction(s) for performing a matrix-matrix-multiplication of two matrices of given sizes and the ML library 280 returns the set of low-level instructions that are needed to perform this library function, or to perform a convolutional operation, wherein the set of low-level instructions includes one or more of loading data from a memory (e.g., OCM) into registers, executing dot-product, and storing the data back into the memory.

In some embodiments, the set of low-level instructions are in the format of instruction set architecture (ISA) designed for efficient data processing covering, for non-limiting examples, one or more of different addressing modes, native data types, registers, memory architectures, and interrupts. In some embodiments, the ISA is a predominantly asynchronous instruction set, wherein each instruction in the ISA format programs a state-machine, which then runs asynchronously with respect to other state machines. It is appreciated that a series of instructions in the ISA format do not necessarily imply sequential execution. In some embodiments, the ISA provides separate synchronizing instructions to ensure order between instructions where needed. In some embodiments, when being executed on the ML hardware 260, the set of low-level instructions in the ISA format program the ML hardware 260 by one or more of: (i) programming one or more input data streams to the ML hardware 260; (ii) programming one or more operations to be performed on the input data streams; and (iii) programming one or more output data streams from the ML hardware 260.

Figure 3:
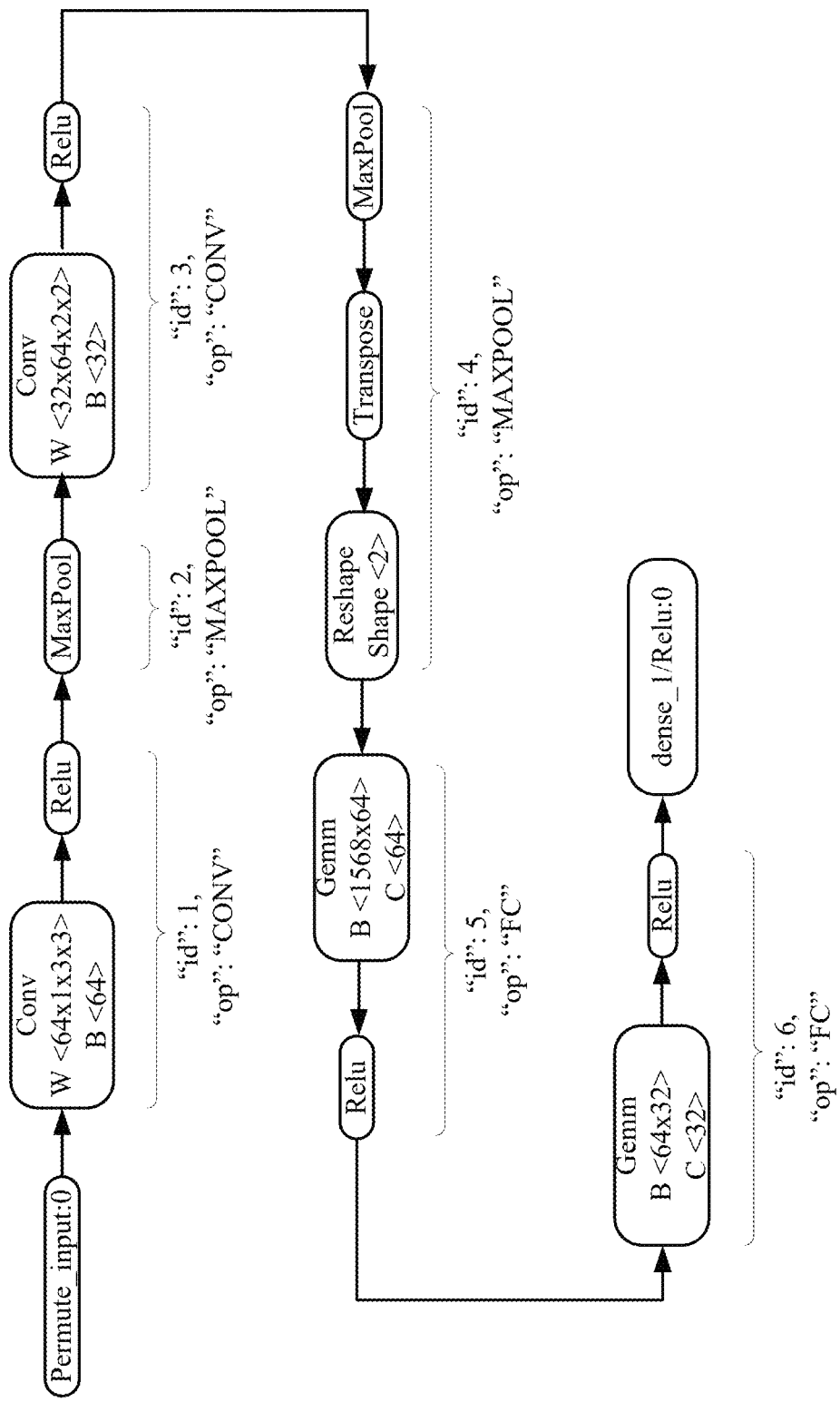
FIG. 3 depicts a network example according to one aspect of the present embodiments.

It is appreciated that in some embodiments, the compiler 220 may receive a network in the high level code 212 from the host 210, as shown in FIG. 3. It is appreciated that the network of FIG. 3 is for illustrative purposes and should not be construed as limiting the scope of the embodiments. The network may include six layers. The first layer may include a convolutional operation followed by a rectified linear unit (relu) operation. The second layer may include a maxpool operation. The third layer may include a convolutional operation followed by a relu operation. The fourth layer may include a maxpool operation. The fifth layer may include a general matrix multiply (GeMM) operation followed by a relu operation. Finally, the sixth layer may include a GeMM operation followed by a relu operation. In one nonlimiting example, the input to the convolution of the first layer may be 8×1×32×32. The convolution of the first layer may have weight of 64×1×3×3 with a kernel size of 3×3, and bias of 64. As such, the output of the convolution of the first layer may be 8×64×30×30, which is input to the relu block of the first layer. The input to the maxpool of the second layer is 8×64×30×30 and the output may be 8×64×15×15. The input to the convolution of the third layer is therefore 8×64×15×15. The convolution of the third layer may have weight of 32×64×2×2 and a kernel of 2×2 size with bias of 32. The output of the convolution of the third layer is 8×32×14×14 which is input of its relu. The output of the relu from the third layer is 8×32×14×14 which is input to the maxpool of the fourth layer. The output of the maxpool of the fourth layer 8×32×7×7. In one nonlimiting example, the fourth layer may further include a transpose and reshape function where the output of the reshape is 8×1568 in size. The output of the reshape is input to the GeMM of the fifth layer. The GeMM of the fifth layer may have a bias of 1568×64 in size and coefficients of 64. The output of GeMM may be 8×64 which is input to the relu of the fifth layer. The output of the relu in fifth layer is 8×64 which is input to a GeMM of the sixth layer with bias size of 64×32 and coefficient of 32 in size. The output of the GeMM in the sixth layer is 8×32 which is input to the relu of the sixth layer having an output of 8×32 in size.

It is appreciated that prior to generating the set of low-level instructions, the compiler 220, during the compile state, may generate compiler related statistical data. For example, during compile state, the compiler 220 may determine the compilation flow and/or high-level instructions associated with the ML model of the received network, for example as shown in FIG. 3. The compiler 220 may subsequently call the ML library 280, e.g., high-level compilation flow library call 222, to fetch the appropriate API associated with a particular instruction in a particular layer. In some nonlimiting examples, the high-level compilation flow library call 222 may include arguments that described the specific computation (e.g., function) and/or communication task to be performed by that ML library 280 API, for the particular layer (or node) of the compilation flow being processed. The ML library 280 may then respond to the request by the compiler 220 with a library call response 282, e.g., by sending the appropriate API.

The response by the ML library 280 may be used by the compiler 220 and fed into a model, e.g., roofline model 225, that may be processed by the processor 230 to generate statistical data 232. It is appreciated that the model such as the roofline model 225 may be provided by the ML library 280 or by the compiler 220. The statistical data 232 may include target specific (e.g., ML hardware 260) runtime performance estimation on a per ML library 280 API basis. It is appreciated that the statistical data 232 is compiler 220 generated because it is based on the API received from the ML library 280 and by feeding the information into a roofline model 225 within the compiler 220 for execution by the processor 230. A nonlimiting example of a roofline model 225 is shown below for illustration purposes only:

```
//static Roof-Line modeling and performance estimations
class RoofLineModel_t {
public:
    uint64_t cycle_cnt_{0};
    uint64_t communication_transfer_bytes_{0};
    float communication_efficiency_{1.0};
    uint64_t computation_ops{0};
    float computation_efficiency_{1.0};
    void Reset( ) {
        cycle_cnt_=0;
        communication_transfer_bytes_=0;
        communication_efficiency_=1.0;
        computation_ops=0;
        computation_efficiency_=1.0;
    }
};
```

It is appreciated that the runtime performance estimation may be used to guide the compiler 220 to generated an alternative compilation flow and/or high-level instructions, change strategies to solve a particular function associated with one or more layers, change the memory layout, replace the original ML library 280 API call with a different but equivalent ML library 280 API call, etc., in order to improve performance. For example, based on the statistical data 232 (i.e., processed data 232) generated by the compiler 220 may be used the compiler 220 to determine that the height/width dimensions on the tensors and/or constants of a network may be flipped in order to achieve a better penalization and/or data alignment.

In other words, statistical data 232 associated with the per instruction (e.g., high-level compilation flow) performance within each layer may be monitored, e.g., effective bytes memory transfer associated with the instruction within a particular layer of the compilation flow, processing element(s) utilization associated with the instruction within a particular layer of the compilation flow, boundary violations associated with the instruction within a particular layer of the compilation flow (e.g., memory wrap around or data hazard for the high-level compilation flow), etc., to guide the compiler 220 in deciding whether to generate an alternative compilation flow, whether to change one or more strategies, whether to change the memory layout, whether to replace the original ML library 280 API call with an equivalent ML library 280 API, mapping of data to memory blocks, changing precision, changing quantization, changing processing tile to perform a particular task/instruction, changing dimension reordering, copying data across processing tiles, changing methodology to split tensors, etc.

Referring now to FIGS. 4A and 4B depict an example of statistical data 232 generated by execution of a roofline model according to one aspect of the present embodiments. High-level instructions associated with each layer is shown along with target specific runtime performance estimation. For example, layer one high-level instructions may be followed by the performance estimation e.g., the number of multiplication accumulation (MACs) of 4147200, the number of parameters 640, etc. Layer two high-level instructions may be followed by the performance estimation, e.g., maximum counts of 460800. Layer three high-level instructions may be followed by the performance estimation e.g., the number of MACs of 12845056, the number of parameters 8224, etc. Layer four high-level instructions may be followed by the performance estimation e.g., maximum counts of 50176. Layer five high-level instructions may be followed by the performance estimation e.g., the number of MACs of 802816, the number of parameters 100416, etc. Layer six high-level instructions may be followed by the performance estimation e.g., the number of MACs of 16384, the number of parameters 2080, etc.

A nonlimiting example of applying a roofline model 225 to primitive function, as devised by the compiler is shown below for illustration purposes only. In this nonlimiting example, two processing elements (e.g., PE and POD) are pipelined and overlap (where the number of overlap stages is 2 as an example).

```
{
    RoofLineModel_t pe_stage_perf_estimates;
    ret_val=Isa::Mlip::PETaskFlattenImpl(&pe_stage_per-
        f_estimates);
    RoofLineModel_t pod_stage_perf_estimates;
    ret_val=Isa::Mlip::PODTaskFlattenImpl(&mllib_
        call0, &pod_stage_perf_estimates); . . .
    //statically derive primitive func's roof-line model's
        performance estimates
    //-pipeline space-time diagram below (when loop_cnt
        is 3)
    //-time=>
    //-PE:PETask-1 PE-Task-2 PE-Task-3
    //-POD: PODTask-1 PODTask-2 PODTask-3
    RoofLineModel_t final_pe_pod_pipeline_overlap;
    //2 is the number of overlapped stages—which we will
        know based on codegen algorithm
    pe_pod_pipeline_overlap.cycle_cnt=pe_stage_perf_
        estimates.cycle_cnt+
        2*max(pe_stage_perf_estimates.cycle_cnt, pod_
            stage_perf_estimates)+
    pod_stage_perf_estimates.cycle_cnt
}
```

It is appreciated that in this nonlimiting example, two overlap stages are present. The overlap regions result from strategies devised by the compiler 220 and that the number of overlap regions may differ based on different strategies, different instructions from ML library 280, etc. In this nonlimiting example, the compiler 220 may change the number of overlap stages by changing the "loop_cnt" which is set to 3 and that results in two overlap regions. It is appreciated that the compiler 220 may generate a different ML library 280 call and a different roofline model 225 or a different one for different overlap stages and subsequently decide on the best strategy to result in the beset performance. It is appreciated that different accelerators, e.g., hardware, have different architecture and the performance of their respective processing may have a wide variation. The roofline model 225 provides an approach for the compiler 220 to make an informed decision on the compiler flow, instructions, etc. It is appreciated that the nonlimiting example above is associated with cycle estimated for illustration purposes only and should not be construed as limited thereto. For example, different calculations may be performed for other performance numbers, e.g., bandwidth, memory usage, etc. Moreover, it is appreciated that the compiler 220 may utilize a specific roofline model for one specific primitive and create another roofline model for the complete model, e.g., each backend compiler's primitive function may has its own associated performance estimation code (i.e., roofline model) and the compiler 220 may generate a full model estimation based on the performance estimation codes for all the primitive functions.

Referring back to FIG. 2A, the compiler 220 may be configured to generate additional information to further correlate the high-level function to one or more layers of a neural network used for machine learning applications. For non-limiting examples, the neural network can be but is not limited to one of a convolution neural network (CNN), a recurrent neural network (RNN), a gradient boosting machine (GBM), and a generative adversarial neural network. For non-limiting examples, the additional information includes but is not limited to which tasks of the high-level function belong to a specific neural network layer as well as which neural network layer the high-level function belongs to.

It is appreciated that the compiler 220 may iteratively go through a similar process and make certain decisions on changes to be made during compilation to improve performance and to optimize the code. Ultimately, the compiler 220 generates (i.e., compiles) low-level instructions (binary) 229 for the ML hardware 260 for execution thereof. Once the set of low-level instructions has been compiled from each high-level function, the compiler 220 is configured to stream the set of low-level instructions as well as data received from the host for the application to the ML hardware 260 for execution. In the example of FIG. 2A, the ML hardware 260 is a dedicated hardware block/component including one or more microprocessors and/or on-chip memory (OCM) units storing the data and/or the set of low-level instructions compiled from the high-level code performing one or more ML operations. For a non-limiting example, the ML hardware 260 can be but is not limited to an inference engine, which is configured to infer and identify a subject for the application via inference from trained data. At runtime, the ML hardware 260 is configured to retrieve the set of low-level instructions and/or data received from the compiler 220 and execute the set of low-level instructions to perform the high-level application/ML operation according to the set of low-level instructions. FIG. 1 depicts a non-limiting example of an inference engine 260 that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one OCM, a first type of processing unit (POD), and a second type of processing unit (PE). Both types of processing units can execute and be programmed by some of the plurality of low-level instructions received from the compiler 220. In some embodiments, a plurality of processing tiles forms a processing block, e.g., tiles 0-3 forms processing block 1 and the processing tiles within each processing block are coupled to one another via a routing element, e.g., tiles 0-3 are coupled to one another via routing element R to form processing block 1.

In order to generate the low-level instructions from high-level functions/code, the compiler 220 having knowledge of the ML hardware 260 architecture and software/system requirements makes certain decisions and performs certain operations in order to generate low-level instructions that are as efficient and as optimized as possible (e.g., from hardware perspective and/or software perspective). For example, the compiler 220 may take certain actions and make certain decisions to reduce data movement, to reduce data conversions, to reduce storage usage, to reduce computation (or duplication of computation), to reduce communication (by duplicating compute if beneficial), etc. A nonlimiting and non-exhaustive list of decisions (e.g., external strategies) being made by the compiler 220 in addition to the above includes but is not limited to:

- identifying and associating certain sub-graphs of a layer to be processed by ML hardware 260 but other sub-graphs to other processing components (e.g., a central processing unit),
- fusing operators into composite to map to hardware ISA task (i.e., maps optimally to hardware architecture capabilities),
- splitting input/output tensors of an operation into N parts where N may be the maximum number of tiles or smaller and distributing the parts across the N tiles. The parts may be of unequal sizes and the split input/output may duplicate the associated weights and bias tensors across all N tiles,
- splitting weights/bias (similar to splitting input/output but applied to weights/bias),
- SAMM/LAMM (different mappings of two matrices onto the POD registers based on the shape of the matrices and where SAMM indicates one dimension of the input being short whereas LAMM indicates one dimension of the input being long),
- direct convolution (i.e., performing a convolution by directly applying the kernel to the input tensor in contrast to converting a convolution into a matrix-matrix-multiply that is executed after the input tensor is transformed by the flattening stage which results in an increased data movement and data duplication),
- serializing in time (i.e., mapping an operation into a sequence of steps that are executed sequentially in time),
- number of tiles to use for certain processing/tasks,
- dividing tensors and duplicating on tiles (i.e., manner by which to map data to local tiles either distribute or copy or both, where a set of tiles may be grouped together and within the group the data may be split after the original data is duplicated or copied to each group),
- number of halo cells (i.e. also referred to as ghost cells or rows that are added to distribute data on a tile which contains copies of rows or cells belonging to its neighboring tiles) that allows calculations on a tile be done locally without requiring data to be obtained from neighboring tiles even though it may need the halo cells/rows to be filled via communication prior to executing the calculations,
- data movement,
- rebalancing processing on different tiles,
- memory hierarchy mapping,
- determining tensor life-cycle (i.e., the amount of time that the tensor data is required to be in memory (mapped to local OCM) to ensure that the last task/instruction that needs to have access to the tensor data has access to the tensor data) in order to perform memory management and to free up unused memory,
- quantization scaling values (i.e., the output of a certain layer in a quantized network may be rescaled to stay within a particular data range),
- quantization data types (e.g., signed versus unsigned such as int8 and uint8),
- rescaling,
- determining which primitive to use for a given operator (e.g., direct convolution as opposed to flattening plus compute pipeline, complete fully connected (FC) layer (i.e. a matrix-matrix-multiply that might be performed as one distributed matrix-matrix-multiply (performed as single computation block followed by a single communication block) as opposed to being broken up into a pipeline sequence distributed matrix-matrix-multiplies which allows overlapping of communication and computation),
- input to pipeline decisions (i.e., decision whether to apply a pipeline strategy, e.g., based on matrix sizes the optimal strategy may not be pipelined),
- overlapping different hardware components, e.g., processing elements, direct memory access (DMA), etc., on ML hardware 260 to increase parallelism,
- optimizing use of synchronization primitives
- exposing and utilizing the ML hardware 260 capabilities for diverse set of workloads, e.g., ML workloads,
- memory layout and conversion (e.g., in channel/height/width or height/width/channel format, etc.).

Figure 2B:
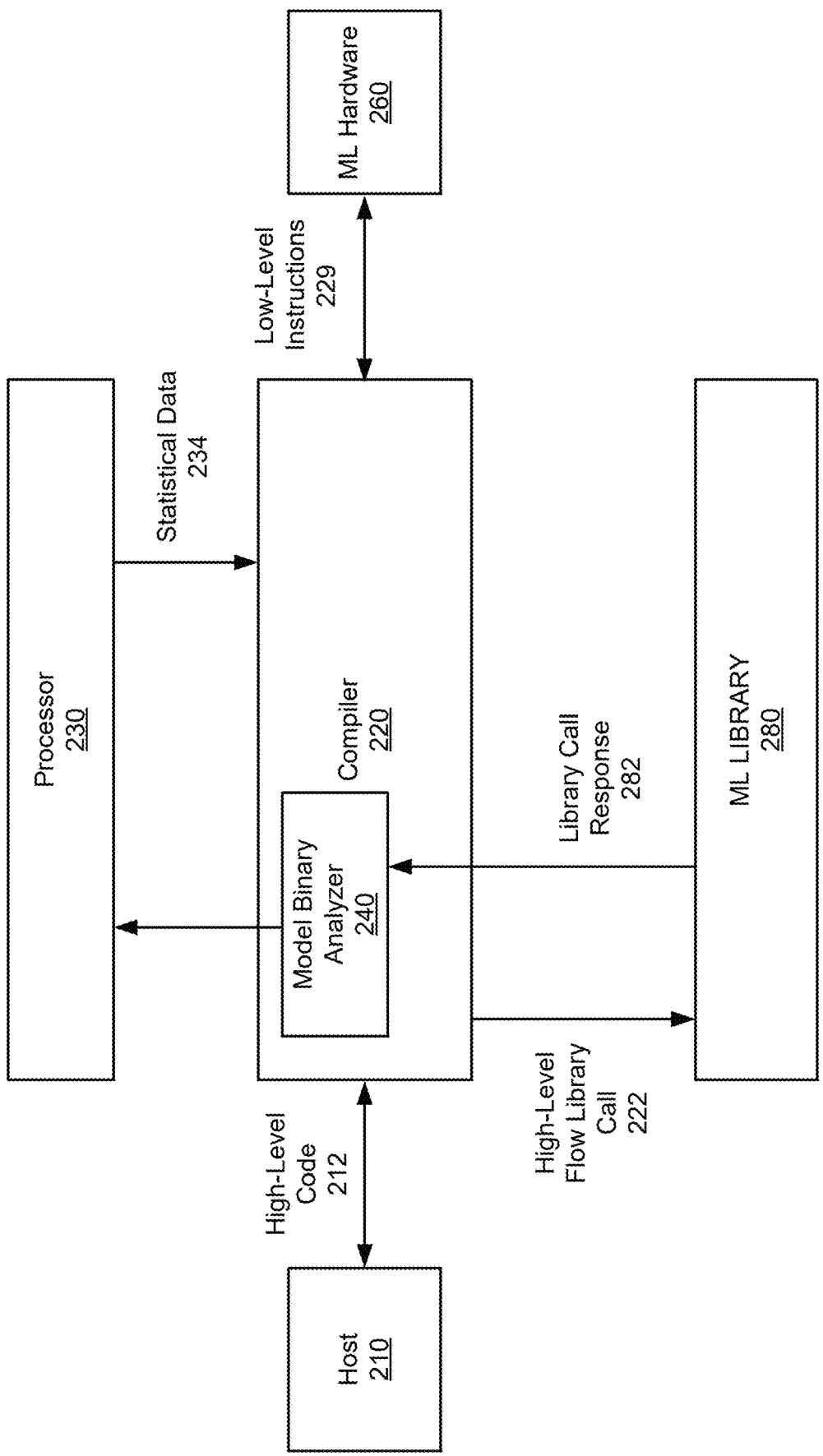
FIG. 2B depicts an example of a diagram of a system that uses statistical data by model binary analyzer during compilation of an application to determine changes that can be made by a compiler to improve performance associated with executing an application on ML hardware according to one aspect of the present embodiments.

Referring now to FIG. 2B, an example of a diagram of a system that uses statistical data by model binary analyzer during compilation of an application to determine changes that can be made by a compiler to improve performance associated with executing an application on ML hardware according to one aspect of the present embodiments is depicted. FIG. 2B is similar to that of FIG. 2A except that the statistical data is generated not based on the roofline model 225 but rather the compiler 220 generates the low-level instructions (binary). It is appreciated that the low-level instructions (binary) may be generated after the compiler 220 selects the final strategy. The low-level instructions (binary) by the compiler 220 may be analyzed by model-binary analyzer 240 within the compiler 220 by causing the processor 230 to execute the software associated with the model binary analyzer 240. The analysis may generate statistical data 234 and it may include an overall analysis of the compilation flow. It is appreciated that the compiler 220 has a knowledge of the hardware architecture that will be executing the low-level instructions (binary), has a knowledge of the operations and tensors, has a knowledge of tensor transformations that have been performed throughout the compilation flow, has a knowledge of the final generated instruction (e.g., an instruction set architecture (ISA)), etc. As such, the compiler 220 is configured to intelligently identify one or more problems associated with the generated low-level instructions (binary), e.g., problems associated with ill-formed on-chip memory (OCM) layout, insufficient data movement, memory access overlap between tasks/ instructions, data hazard between consumer produced tasks, etc.

It is appreciated that the binary analyzer 240 is discussed as being integrated within the compiler 220 for illustrative purposes but should not be construed as limited thereto. For example, the binary analyzer 240 may be separate from the compiler 220. Moreover, it is appreciated that the binary analyzer 240 may be coupled to the ML library 280.

Referring now to FIG. 5, an example of statistical data 234 generated by the model binary analyzer 240 according to one aspect of the present embodiments is shown. As illustrated, statistical data associated with certain identified problems (e.g., warning) may be captured. For example, a warning may be issues for ISA (task 1, instruction 3) because the transfer byte size used is 14 achieving an actual transfer efficiency of 5.46875%. In other words, efficiency associated with task 1 of instruction 3 is relatively low and could potentially be improved by changing certain strategies, memory layout, etc. (as described later below). As another example, task 58 of instruction 2 results in a transfer byte size of 4 resulting in actual transfer efficiency of 1.5625%, which also indicates poor efficiency. As such, the compiler 220 may again make certain decisions to improve the efficiency. It is appreciated that in FIG. 5, other tasks associated with various instructions may also be flagged as having poor efficiency. It is appreciated that in this nonlimiting example, data transfer efficiency is provided for illustrative purposes only and should not be construed as limiting the scope of the embodiments. For example, other types of efficiencies, e.g., utilization of processing elements, parallel processing by various processing elements, etc., may be gauged and captured.

Referring back to FIG. 2B, the compiler 220 may be guided to intelligently decide on alternative compilation flow, changing strategies, changing memory layout, replacing the original ML library 280 API call with an equivalent ML library 280 API call, modifying the mapping of data to memory blocks, modifying precision, modifying quantization, modifying the processing tile to perform a particular task/instruction, reordering dimensions, changing the strategy to copy data across processing tiles, changing the methodology to split tensors, etc., in order to improve performance. Once a decision is made, the compiler 220 may iteratively go through a similar process more than once. Ultimately, the compiler 220 generates low-level instructions (binary) for the hardware/simulator for execution thereof.

Figure 2C:
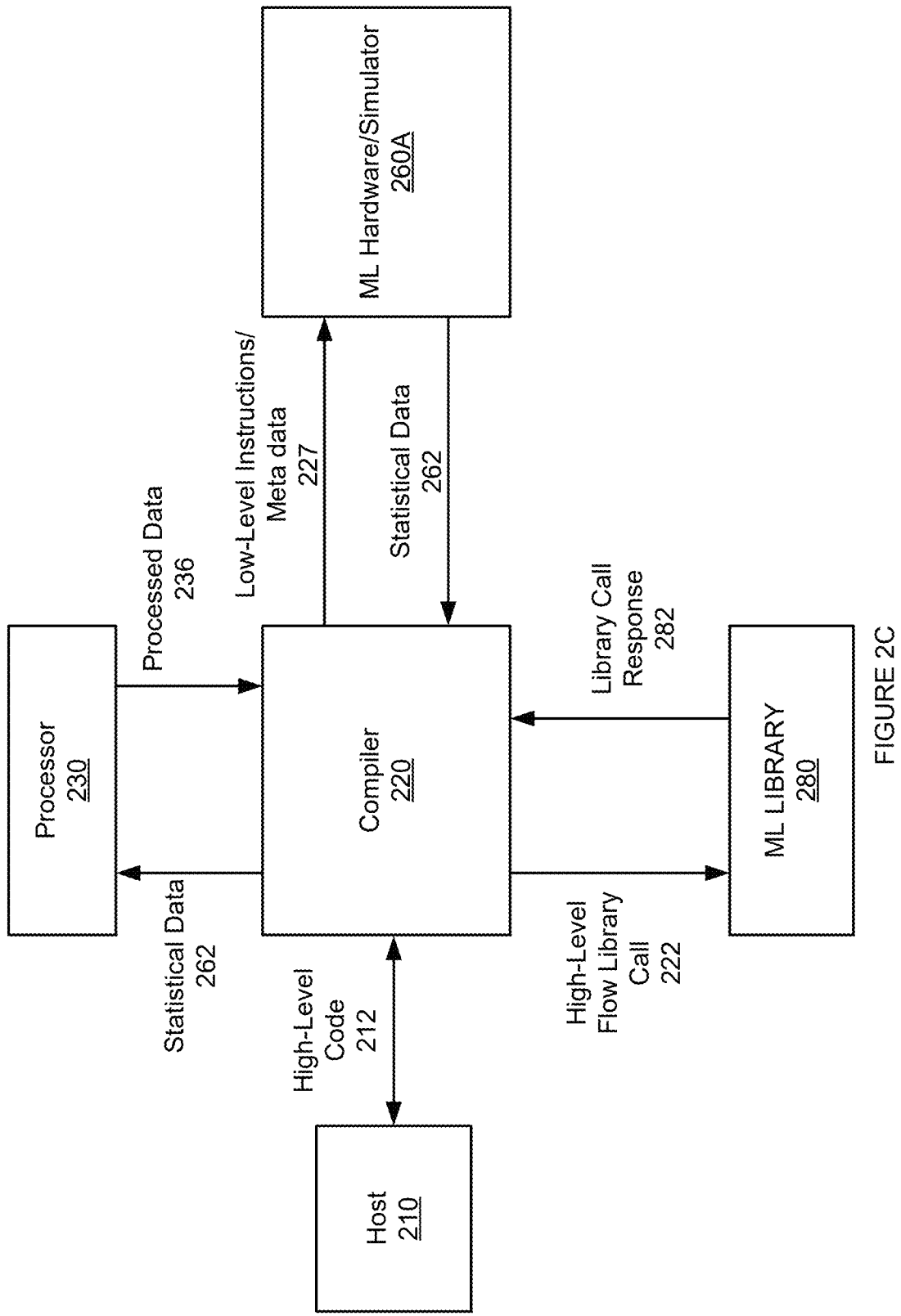
FIG. 2C depicts an example of a diagram of a system that uses statistical data from a hardware/simulator executing low-level instructions to determine changes that can be made by a compiler to improve performance associated with executing an application for running on ML hardware according to one aspect of the present embodiments.

Referring now to FIG. 2C, an example of a diagram of a system that uses statistical data from a hardware/simulator executing low-level instructions to determine changes that can be made by a compiler 220 to improve performance associated with executing an application for running on ML hardware according to one aspect of the present embodiments is depicted. FIG. 2C is similar to that of FIG. 2B except that the compiler 220 generates low-level instructions (binary) as well as meta data 227 for the ML hardware/ simulator 260A and that statistical data 262 is generated by the ML hardware/simulator 260A. ML hardware/simulator 260A may be a hardware that is substantially similar to ML hardware 260 or it may be a simulator that executes the low-level instructions.

It is appreciated that in some embodiments, statistical data 262 may be generated by either the ML hardware/simulator 260A executing the low-level instructions (binary) and/or meta data 227 that were generated by the compiler 220. In other words, statistical data 262 may be generated by the component, e.g., hardware, simulator, etc., running the low-level instructions and/or meta data 227 (binary).

It is appreciated that in one nonlimiting example, the compiler 220 in addition to the low-level instructions (binary) may generate one or more meta data. The generated meta data may provide additional information regarding the ML model such as the layers and their respective mapping to specific code, e.g., high-level instructions, sections. Both the low-level instructions and/or meta data 227 may be provided to the ML hardware/simulator 260A for execution.

The low-level instructions (binary) and/or meta data may be generated by the compiler 220 based on a devised strategy by the compiler. For example, referring specifically to FIG. 6, high-level instructions strategies devised by the compiler 220 for each layer (i.e., layer 1-6) is shown. It is appreciated that the high-level instructions, as shown, are associated with the network of FIG. 3. The first layer, as devised by the compiler 220, comprises a convolution/ transpose as its first open neural network exchange (ONNX) operation followed by a relu operation as its last ONNX operation. The compiler 220 in this nonlimiting example may also generate a task identification (ID), an instruction ID, etc., that may be used by the ML hardware/simulator 260A and/or firmware to identify a particular layer and to collect statistical data associated with each layer, task, instruction, etc. For example, the first layer may be identified as "id" of 1, the first instruction ID associated with the first layer may be identified as "first_inst_id" of 0 and its last instruction may be identified as "last_inst_id" of 242. In other words, the first layer may include 243 instructions to perform the operations needed in the first layer. In some nonlimiting example, the second layer comprises a maxpool operation, as devised by the compiler 220. The second layer may be identified as "id" of 2, its first instruction in layer 2 may be identified as "first_inst_id" of 243 and its last instruction in layer 2 may be identified as "last_inst_id" of 251. It is appreciated that the third layer includes a convolution operation as a first ONNX operation followed by a relu operation as its last ONNX operation. The third layer may be identified as "id" of 3, its first instruction in layer 3 may be identified as "first_inst_id" of 252 and its last instruction in layer 3 may be identified as "last_inst_id" of 262. The fourth layer comprises a first ONNX operation of maxpool followed by the last ONNX operation of flattening and reshaping. The fourth layer may be identified as "id" of 4, its first instruction in layer 4 may be identified as "first_inst_id" of 263 and its last instruction in layer 4 may be identified as "last_inst_id" of 271. The fifth layer comprises a first ONNX operation of dense matrix multiplication and a last ONNX operation of dense relu operation. The fifth layer may be identified as "id" of 5, its first instruction in layer 5 may be identified as "first_inst_id" of 272 and its last instruction in layer 5 may be identified as "last_inst_id" of 339. The sixth layer comprises a first ONNX operation as dense matrix multiplication followed by last ONNX operation of dense relu. The sixth layer may be identified as "id" of 6, its first instruction in layer 6 may be identified as "first_inst_id" of 340 and its last instruction in layer 6 may be identified as "last_inst_id" of 349. It is appreciated that output of layer one is fed into layer two, the output of layer two is fed into layer three, the output of layer three is fed into layer four, the output of layer four is output into layer five, and the output of layer five is fed into layer six. Low-level instructions and/or meta data 227 associated with the high-level instructions, as devised by the compiler 220 and as shown in FIG. 6, are generated.

Referring back to FIG. 2C, integration between the compiler 220 and the runtime (execution by hardware/simulator 260A) enables the process to be automated and driven by the compiler 220. It is further appreciated that the low-level instructions (binary) and/or meta data 227 may be executed by the hardware/simulator 260A to generate statistical data 262. The statistical data 262 may include the number of cycle counts that are collected from the hardware/simulator 260A running the low-level instructions and/or meta data 227. For example, statistical data 262 generated by hardware/simulator 260A may include space/time data (e.g., diagram) that illustrates the activities associated with each component (e.g., hardware component such as processing elements, OCM, etc.) during runtime.

Referring specifically to FIGS. 7A and 7B, statical data 262 generated by a hardware or a simulator executing the low-level instructions according to one aspect of the present embodiments is shown. Referring specifically to FIG. 7A, statistical data associated with each layer is shown. For example, the initialization layer involves 8 processing tiles, take 6500 cycles and include no MAC counts. In one nonlimiting example, the first layer may involve 8 processing tiles, take 8905 cycles and a 4147200 number of MAC counts. In one nonlimiting example, the second layer may involve 8 processing tiles, takes 5440 cycles and no MAC counts. In one nonlimiting example, the third layer may involve 8 processing tiles that take 2068 cycles with 12845056 number of MAC counts. In one nonlimiting example, the fourth layer may involve 8 processing tiles that take 628 cycles with no MAC counts. In one nonlimiting example, the fifth layer may involve 8 processing tiles that take 1007 cycles with 802816 number of MAC counts. In one nonlimiting example, the sixth layer may involve 8 processing tiles that take 95 cycles with 16384 number of MAC counts. The output may involve 1 processing tile and include 92 cycles.

Referring specifically to FIG. 7B, statistical data associated with each layer is shown. FIG. 7B is similar to that of FIG. 7A but includes additional information. In this nonlimiting example, additional statistical data associated with each layer includes tera operation per second (TOPS), tera floating-point operations ("TFLOPS"), integer efficiencies ("INT_Eff"), floating-point efficiencies ("FP_Eff"), maximum number of bytes for the OCM associated with its respective processing tile ("max_ocm_bytes"), maximum percentage of OCM usage ("max_ocm_usage"), number of cycles that the processing element (POD) is used ("POD_Cycles"), number of cycles that processing element (PE) is used ("PE_Cycles"), number of direct memory access (DMA) cycles ("DMA_Cycles"), etc.

Accordingly, the compiler 220 or the user may use the statistical data 262 to determine whether parallel tasks are overlapped appropriated and whether synchronization results in unnecessary latencies, etc. The compiler 220 may then take appropriate actions based on the statistical data 262 in order to optimize the code by generating an alternative compilation flow, changing strategies, changing memory layout, replacing the original ML library 280 API call with an equivalent ML library 280 API call, modifying the mapping of data to memory blocks, modifying precision, modifying quantization, modifying the processing tile to perform a particular task/instruction, reordering dimensions, changing the strategy to copy data across processing tiles, changing the methodology to split tensors, etc. Once the code is optimized, the compiler 220 may regenerate an updated low-level instructions (binary) and/or meta data 227 for execution by hardware/simulator 260A. It is appreciated that this process may occur iteratively, as needed, to further optimize the code. It is appreciated that the final low-level instructions (binary) may be generated by the compiler 220 based on the final optimized code for execution by hardware/simulator 260A.

It is appreciated that the statistical data generated by the ML hardware/simulator 260A, as described above, is for illustration purposes only and should not be construed as limiting the scope of the embodiments. For example, in some embodiments, statistical data associated with cache line access may be captured. In one nonlimiting example, a latency penalty may be associated with two read requests from the same cache line that are not at least 128 bytes apart. As such, capturing statistical data associated with read requests from the same cache line may be used by the compiler 220 to adjust the size of data being read, e.g., changing the size to 256 bytes and to internally divide the data in order to avoid the latency penalty. In other words, the statistical data may be used by the compiler 220 to change strategy and make necessary changes in order to optimize the code and improve the efficiency.

Figure 8:
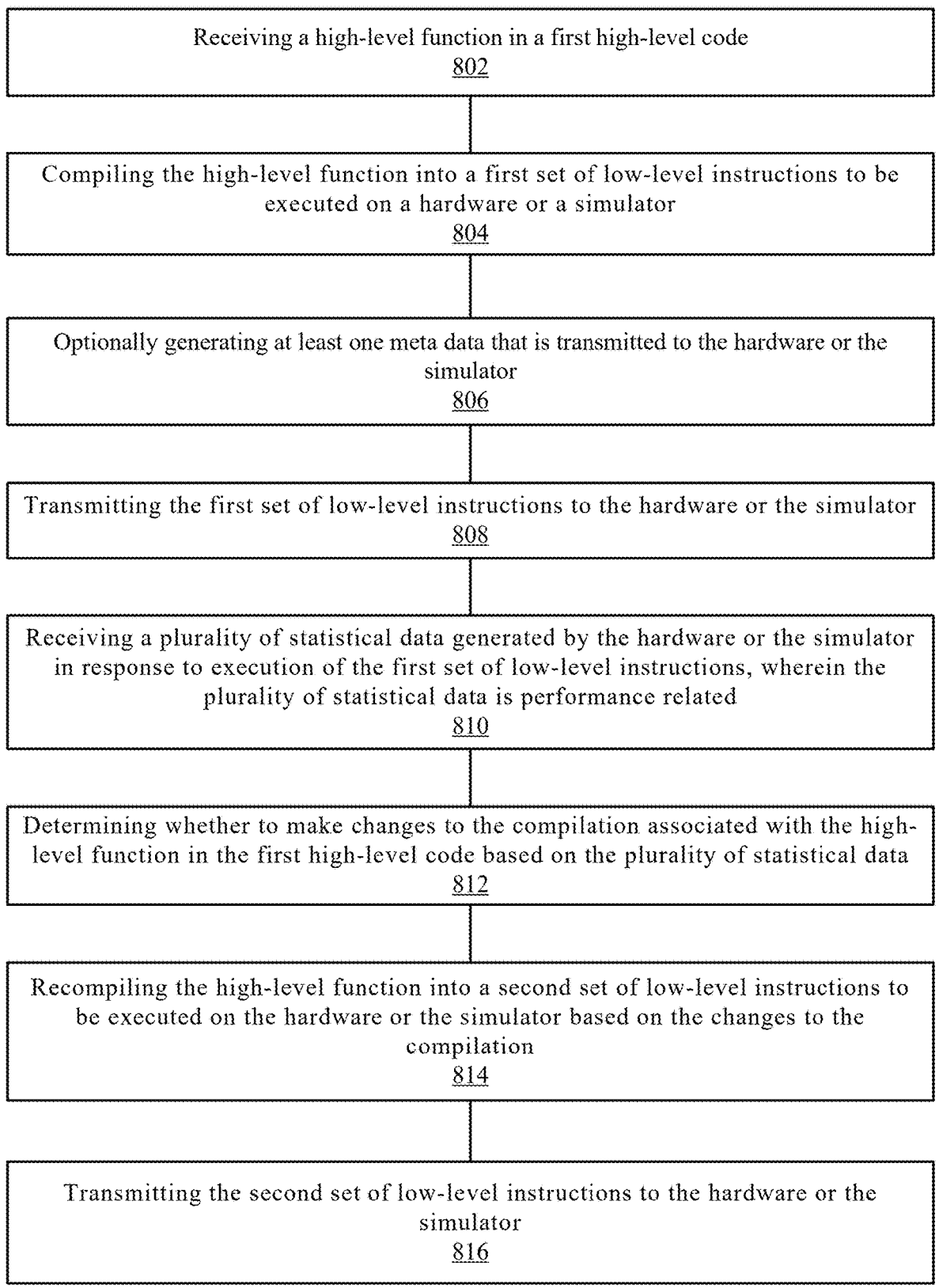
FIG. 8 depicts a flowchart of an example of a process for generating statistical data and using the statistical data to determine changes that can be made by a compiler to improve performance associated with executing an application on ML hardware/simulator according to one aspect of the present embodiments.

FIG. 8 depicts a flowchart of an example of a process for generating statistical data and using the statistical data to determine changes that can be made by a compiler to improve performance associated with executing an application on ML hardware/simulator according to one aspect of the present embodiments. At step 802, a high-level function in a first high-level code is received, as described above with respect to FIGS. 1 and 2C. At step 804, the high-level function is compiled into a first set of low-level instructions to be executed on a hardware or a simulator, as described in FIGS. 1 and 2C. At step 806, at least one meta data (e.g., information associated with ML model being executed, information associated with a layer of the ML model, mapping of a code section of the first high-level code to the layer of the ML model, etc.) is optionally generated and is transmitted to the hardware or the simulator, as described in FIGS. 2C and 6. At step 808, the first set of low-level instructions is transmitted to the hardware or the simulator, as described in FIG. 2C. At step 810, a plurality of statistical data generated by the hardware or the simulator in response to execution of the first set of low-level instructions is received, as described in FIGS. 2C and 7A-7B. It is appreciated that the statistical data may be automatically generated by the hardware or the simulator. It is appreciated that the plurality of statistical data is performance related (e.g., activities associated with a hardware component in the hardware or the simulator such as processing element, OCM, etc.), as described in FIGS. 2C, 7A and 7B. In one nonlimiting example, the statistical data includes the number of DMA cycles for the hardware or the simulator or the number of cycles associated with a layer of the ML model. At step 812, the compiler determines whether to make changes to the compilation associated with the high-level function in the first high-level code based on the plurality of statistical data, as described in FIGS. 2C, 7A, and 7B. At step 814, the high-level function is recompiled into a second set of low-level instructions to be executed on the hardware or the simulator based on the changes to the compilation, as described in FIGS. 2C, 7A, and 7B. At step 816, the second set of low-level instructions is transmitted to the hardware or the simulator, as described in FIGS. 2C and 7A-7B. As such, the second set of low-level instructions may be executed by the hardware or the simulator. It is appreciated that the second set of low-level instructions may be more optimized in comparison to the first set of low-level instructions. It is appreciated that the described process above may be repeated any number of times until the desired optimization and/or efficiencies is achieved.

In some embodiments, a compiler implemented method, comprising: receiving a high-level function in a first high-level code; determining a first compiler flow associated with the high-level function; generating at least a first instruction for performing the high-level function in the first high-level code based on the first compiler flow; applying a model to the generated the at least the first instruction to generate at least a first performance estimation; determining whether to make changes to the first compiler flow or the generated at least the first instruction based on the at least first performance estimation; modifying the first compiler flow or the generated that at least first instruction in response to determining that the changes are needed to generate a second compiler flow or at least a second instruction respectively; and compiling the high-level function into a first set of low-level instructions based on the modification if modification is made and compiling the high-level function into a second set of low-level instructions if no modification is made, wherein the first set of low-level instructions or the second set of low-level instructions are to be executed on a hardware or a simulator.

It is appreciated that the compiler implemented method may further include transmitting the first set of low-level instructions to the hardware or the simulator for execution. In some embodiments the model is a roofline model. According to some embodiments, the high-level function in the first high-level code is associated with a ML model. In one nonlimiting example, the performance estimation includes at least a number of parameters being processed, or a number of multiplication accumulations, or maximum number of cycle counts. According to some embodiments, the generating the at least one instruction is by calling an ML library to fetch the at least one instruction. In one nonlimiting example, the performance estimation is a target specific runtime performance estimation on a per ML instruction. According to some embodiments, the compiler implemented method further includes subsequent to the modifying and prior to the compiling, applying the model to the second compiler flow or the at least the second instruction to generate a second performance estimation; determining whether to make further changes to the second compiler flow or the at least the second instruction respectively based on the second performance estimation; and modifying the second compiler flow or the at least the second instruction in response to a determination that further modifications are needed.

In some embodiments, a compiler implement includes receiving a high-level function in a first high-level code; determining a first compiler flow associated with the high-level function, wherein the first compiler flow has at least one instruction associated therewith; applying a model to the at least one instruction to generate at least a first performance estimation; determining whether to make changes to the first compiler flow or the least one instruction associated therewith based on the at least first performance estimation; modifying the first compiler flow or the least one instruction associated therewith in response to determining that the changes are needed to generate a second compiler flow or at least a second instruction associated therewith; and compiling the high-level function into a first set of low-level instructions based on the modification if modification is made and compiling the high-level function into a second set of low-level instructions if no modification is made, wherein the first set of low-level instructions or the second set of low-level instructions are to be executed on a hardware or a simulator.

According to some embodiments, the compiler implemented method further includes transmitting the first set of low-level instructions or the second set of low-level instructions to the hardware or the simulator for execution. It is appreciated that in some embodiments, the model is a roofline model. In one nonlimiting example, the high-level function in the first high-level code is associated with a ML model. According to some embodiments, the performance estimation includes at least a number of parameters being processed, or a number of multiplication accumulations, or maximum number of cycle counts. In one nonlimiting example, the at least one instruction is received by the compiler calling a library. It is appreciated that the performance estimation is a target specific runtime performance estimation on a per ML instruction. In some embodiments, the compiler implemented method further includes: subsequent to the modifying and prior to the compiling, applying the model to the second compiler flow or the at least the second instruction to generate a second performance estimation; subsequent to the modifying and prior to the compiling, determining whether to make further changes to the second compiler flow or the at least the second instruction respectively based on the second performance estimation; subsequent to the modifying and prior to the compiling, modifying the second compiler flow or the at least the second instruction in response to a determination that further modifications are needed.

In some embodiments, a compiler implemented method include: receiving a high-level function in a first high-level code; compiling the high-level function into a first set of low-level instructions; analyzing the first set of low-level instructions using a model-binary analyzer; determining whether to make changes to a compiler flow or instructions associated with the high-level function in the first high-level code based on the analysis; and compiling the high-level function into a second set of low-level instructions in response to a determination that changes are needed.

It is appreciated that in some embodiments, the compiler implemented method further includes transmitting the first set of low-level instructions to a hardware or a simulator for execution in response to the determination that no changes are needed; and transmitting the second set of low-level instructions to the hardware or the simulator for execution in response to the determination that changes are need. In one nonlimiting example, the high-level function in the first high-level code is associated with an ML model. In some embodiments, the analyzing comprises identifying a data hazard occurrence, an on-chip memory layout, memory access overlap between tasks of an instruction, or modification to a compiler flow. In some embodiments, the changes include modifying a memory layout, replacing an instruction provided by a library with a different instruction, modifying a processing tile associated with performing a task associated with an instruction, reordering dimensions of a tensor data, or changing strategy in copying data across one or more processing tiles. In one nonlimiting example, the analysis includes information is associated with data movement.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A compiler implemented method, comprising:
receiving a high-level function in a first high-level code;
compiling the high-level function into a first set of low-level instructions to be executed on a hardware or a simulator;
generating at least one meta data during the compiling, wherein the at least one meta data is generated based on a strategy generated by the compiler, wherein the at least one meta data includes information associated with a layer of a machine learning (ML) model being executed on the hardware or the simulator;
transmitting the first set of low-level instructions to the hardware or the simulator;
receiving a plurality of statistical data generated by the hardware or the simulator in response to execution of the first set of low-level instructions;
determining whether to make changes to the compilation associated with the high-level function in the first high-level code based on the plurality of statistical data, wherein the changes to the compilation includes at least one or more of changing a memory layout, replacing one ML library call with another ML library call, modifying a mapping of data to memory blocks, modifying a precision for an instruction, modifying quantization for the instruction, modifying a processing element to perform a particular operation associated with the instruction, reordering of data dimensions, and a change to methodology to split tensors;
recompiling the high-level function into a second set of low-level instructions to be executed on the hardware or the simulator based on the changes to the compilation; and
transmitting the second set of low-level instructions to the hardware or the simulator.

2. The compiler implemented method of claim 1 further comprising transmitting the at least one meta data to the hardware or the simulator.

3. The compiler implemented method of claim 1, wherein the information includes a mapping of a code section of the first high-level code to the layer of the ML model.

4. The compiler implemented method of claim 1, wherein the plurality of statistical data is automatically generated by the hardware or the simulator.

5. The compiler implemented method of claim 1, wherein the plurality of statistical data is performance related, and wherein the plurality of statistical data includes activities associated with at least one hardware component of the hardware or the simulator during execution of the first set of low-level instructions.

6. The compiler implemented method of claim 5, wherein the at least one hardware component includes a processing element.

7. The compiler implemented method of claim 5, wherein the at least one hardware component includes an on-chip memory (OCM).

8. The compiler implemented method of claim 1, wherein the statistical data is associated with a direct memory access (DMA) cycles of the hardware or the simulator.

9. The compiler implemented method of claim 1, wherein the statistical data includes cycle counts associated with a layer of a machine learning model.

10. The compiler implemented method of claim 1, wherein the changes to the compilation reduces at least one or more of data movement, data storage, duplication of computations, data conversions, and communications.

11. A system, comprising:
a hardware processor configured to process data; and
a compiler executing on the processor, wherein the compiler is configured to receive a high-level function in a first high-level code;
compile the high-level function into a first set of low-level instructions to be executed on a hardware or a simulator;
generate at least one meta data when the high-level function is compiled into the first set of low-level instructions, wherein the at least one meta data is generated based on a strategy generated by the compiler, wherein the at least one meta data includes information associated with a layer of a machine learning (ML) model being executed on the hardware or the simulator;
transmit the first set of low-level instructions to the hardware or the simulator;
receive a plurality of statistical data generated by the hardware or the simulator in response to execution of the first set of low-level instructions;
determine whether to make changes to the compilation associated with the high-level function in the first high-level code based on the plurality of statistical data, wherein the changes to the compilation includes at least one or more of changing a memory layout, replacing one ML library call with another ML library call, modifying a mapping of data to memory blocks, modifying a precision for an instruction, modifying quantization for the instruction, modifying a processing element to perform a particular operation associated with the instruction, reordering of data dimensions, and a change to methodology to split tensors;
recompile the high-level function into a second set of low-level instructions to be executed on the hardware or the simulator based on the changes to the compilation; and
transmit the second set of low-level instructions to the hardware or the simulator.

12. The system of claim 11, wherein the compiler is further configured to transmit the at least one meta data to the hardware or the simulator.

13. The system of claim 11, wherein the information includes a mapping of a code section of the first high-level code to the layer of the ML model.

14. The system of claim 11, wherein the plurality of statistical data is automatically generated by the hardware or the simulator.

15. The system of claim 11, wherein the plurality of statistical data is performance related, and wherein the plurality of statistical data includes activities associated with at least one hardware component of the hardware or the simulator during execution of the first set of low-level instructions.

16. The system of claim 15, wherein the at least one hardware component includes a processing element.

17. The system of claim 15, wherein the at least one hardware component includes an on-chip memory (OCM).

18. The system of claim 11, wherein the statistical data is associated with a direct memory access (DMA) cycles of the hardware or the simulator.

19. The system of claim 11, wherein the statistical data includes cycle counts associated with a layer of a machine learning model.

20. A system, comprising:
a means for receiving a high-level function in a first high-level code;
a means for compiling the high-level function into a first set of low-level instructions to be executed on a hardware or a simulator;
a means for generate generating at least one meta data when the high-level function is compiled into the first set of low-level instructions, wherein the at least one meta data is generated based on a strategy generated by the compiler, wherein the at least one meta data includes information associated with a layer of a machine learning (ML) model being executed on the hardware or the simulator;
a means for transmitting the first set of low-level instructions to the hardware or the simulator;
a means for receiving a plurality of statistical data generated by the hardware or the simulator in response to execution of the first set of low-level instructions;
a means for determining whether to make changes to the compilation associated with the high-level function in the first high-level code based on the plurality of statistical data, wherein the changes to the compilation includes at least one or more of changing a memory layout, replacing one ML library call with another ML library call, modifying a mapping of data to memory blocks, modifying a precision for an instruction, modifying quantization for the instruction, modifying a processing element to perform a particular operation associated with the instruction, reordering of data dimensions, and a change to methodology to split tensors;
a means for recompiling the high-level function into a second set of low-level instructions to be executed on the hardware or the simulator based on the changes to the compilation; and
a means for transmitting the second set of low-level instructions to the hardware or the simulator.

21. A compiler implemented method, comprising:
receiving a high-level function in a first high-level code;
compiling the high-level function into a first set of low-level instructions to be executed on a hardware or a simulator;
generating at least one meta data during the compiling, wherein the at least one meta data is generated based on a strategy generated by the compiler, wherein the at least one meta data includes information associated with a first layer of a machine learning (ML) model being executed on the hardware or the simulator, wherein the information includes a mapping of a code section of the first high-level code to the first layer of the ML model;
transmitting the first set of low-level instructions to the hardware or the simulator;
receiving a plurality of statistical data generated by the hardware or the simulator in response to execution of the first set of low-level instructions, and wherein the plurality of statistical data includes cycle counts associated with a second layer of the ML model;
determining whether to make changes to the compilation associated with the high-level function in the first high-level code based on the plurality of statistical data;
recompiling the high-level function into a second set of low-level instructions to be executed on the hardware or the simulator based on the changes to the compilation; and
transmitting the second set of low-level instructions to the hardware or the simulator.

22. The compiler implemented method of claim 21 further comprising transmitting the at least one meta data to the hardware or the simulator.

23. The compiler implemented method of claim 21, wherein the plurality of statistical data is automatically generated by the hardware or the simulator, and wherein the plurality of statistical data is performance related, and wherein the plurality of statistical data includes activities associated with at least one hardware component of the hardware or the simulator during execution of the first set of low-level instructions.

24. The compiler implemented method of claim 23, wherein the at least one hardware component includes a processing element or an on-chip memory (OCM).

25. The compiler implemented method of claim 21, wherein the statistical data is associated with a direct memory access (DMA) cycles of the hardware or the simulator.

26. The compiler implemented method of claim 21, wherein the changes to the compilation reduces at least one or more of data movement, data storage, duplication of computations, data conversions, and communications.

27. The compiler implemented method of claim 21, wherein the first layer is a same as a second layer.

28. A system, comprising:
a hardware processor configured to process data; and
a compiler executing on the processor, wherein the compiler is configured to receive a high-level function in a first high-level code;
compile the high-level function into a first set of low-level instructions to be executed on a hardware or a simulator;
generate at least one meta data when the high-level function is compiled into the first set of low-level instructions, wherein the at least one meta data is generated based on a strategy generated by the compiler, wherein the at least one meta data includes information associated with a first layer of a machine learning (ML) model being executed on the hardware or the simulator, wherein the information includes a mapping of a code section of the first high-level code to the first layer of the ML model;
transmit the first set of low-level instructions to the hardware or the simulator;
receive a plurality of statistical data generated by the hardware or the simulator in response to execution of the first set of low-level instructions, and wherein the plurality of statistical data includes cycle counts associated with a second layer of the ML model;
determine whether to make changes to the compilation associated with the high-level function in the first high-level code based on the plurality of statistical data;
recompile the high-level function into a second set of low-level instructions to be executed on the hardware or the simulator based on the changes to the compilation; and
transmit the second set of low-level instructions to the hardware or the simulator.

29. The system of claim 28, wherein the compiler is further configured to transmit the at least one meta data to the hardware or the simulator.

30. The system of claim 28, wherein the plurality of statistical data is automatically generated by the hardware or the simulator, and wherein the plurality of statistical data is performance related, and wherein the plurality of statistical data includes activities associated with at least one hardware component of the hardware or the simulator during execution of the first set of low-level instructions.

31. The system of claim 30, wherein the at least one hardware component includes a processing element or an on-chip memory (OCM).

32. The system of claim 28, wherein the statistical data is associated with a direct memory access (DMA) cycles of the hardware or the simulator.

33. The system of claim 28, wherein the first layer is a same as the second layer.

34. A system, comprising:
- a means for receiving a high-level function in a first high-level code;
- a means for compiling the high-level function into a first set of low-level instructions to be executed on a hardware or a simulator;
- a means for generating at least one meta data when the high-level function is compiled into the first set of low-level instructions, wherein the at least one meta data is generated based on a strategy generated by the compiler, wherein the at least one meta data includes information associated with a first layer of a machine learning (ML) model being executed on the hardware or the simulator, wherein the information includes a mapping of a code section of the first high-level code to the first layer of the ML model;
- a means for transmitting the first set of low-level instructions to the hardware or the simulator;
- a means for receiving a plurality of statistical data generated by the hardware or the simulator in response to execution of the first set of low-level instructions, and wherein the plurality of statistical data includes cycle counts associated with a second layer of the ML model;
- a means for determining whether to make changes to the compilation associated with the high-level function in the first high-level code based on the plurality of statistical data;
- a means for recompiling the high-level function into a second set of low-level instructions to be executed on the hardware or the simulator based on the changes to the compilation; and
- a means for transmitting the second set of low-level instructions to the hardware or the simulator.

* * * * *